(12) United States Patent
Meiri

(10) Patent No.: US 7,613,890 B1
(45) Date of Patent: Nov. 3, 2009

(54) CONSISTENT REPLICATION ACROSS MULTIPLE STORAGE DEVICES

(75) Inventor: David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 11/395,635

(22) Filed: Mar. 31, 2006

(51) Int. Cl.
*G06F 12/00* (2006.01)

(52) U.S. Cl. ............................ 711/162; 711/112

(58) Field of Classification Search ............. None
See application file for complete search history.

(56) References Cited

U.S. PATENT DOCUMENTS

| | | | |
|---|---|---|---|
| 5,206,939 A | 4/1993 | Yanai et al. | |
| 5,537,568 A | 7/1996 | Yanai et al. | |
| 5,742,792 A * | 4/1998 | Yanai et al. ............... | 711/162 |
| 5,778,394 A | 7/1998 | Galtzur et al. | |
| 5,778,430 A | 7/1998 | Ish et al. | |
| 5,845,147 A | 12/1998 | Vishlitzky et al. | |
| 5,857,208 A | 1/1999 | Ofek | |
| 6,397,292 B1 * | 5/2002 | Venkatesh et al. ......... | 711/114 |
| 6,643,671 B2 * | 11/2003 | Milillo et al. .............. | 707/204 |
| 6,775,794 B1 * | 8/2004 | Horst et al. ................ | 714/42 |
| 7,113,945 B1 | 9/2006 | Moreshet et al. | |

OTHER PUBLICATIONS

U.S. Appl. No. 10/720,969, filed May 26, 2005, Kopylovitz.
U.S. Appl. No. 10/802,489, Oliveira.
U.S. Appl. No. 10/808,781, Oliveira.
U.S. Appl. No. 11/324,766, Meiri.
U.S. Appl. No. 11/324,747, Meiri.
U.S. Appl. No. 11/325,078, Meiri.
U.S. Appl. No. 10/120,016, Vishlitzky.
U.S. Appl. No. 10/306,187, filed Nov. 6, 2003, Pocock.
U.S. Appl. No. 10/306,268, filed Oct. 16, 2003, Vishlitzky.
U.S. Appl. No. 10/306,378, filed Nov. 6, 2003, Vishlitzky.
U.S. Appl. No. 10/306,706, filed Oct. 16, 2003, Vishlitzky.
U.S. Appl. No. 10/306,659, filed Oct. 16, 2003, Vishlitzky.
U.S. Appl. No. 11/502,844, Moreshet.

\* cited by examiner

*Primary Examiner*—Reginald G Bragdon
*Assistant Examiner*—Thanh D Vo
(74) *Attorney, Agent, or Firm*—Muirhead and Saturnelli, LLC

(57) ABSTRACT

Concurrently replicating a plurality of storage devices includes disabling writes to all of the storage devices, setting a pending state change indicator for all of the storage devices after disabling writes without altering a replication state of any of the storage devices, and enabling writes to the storage devices after setting the pending state change indicator. An I/O operation to a particular one of the storage devices having a set pending state change indicator may cause the replication state of the particular one of the storage devices to change to provide for replication. Concurrently replicating a plurality of storage devices may include, following changing the replication state of the particular one of the storage devices, clearing the pending state change indicator.

20 Claims, 7 Drawing Sheets

CONSISTENT REPLICATION ACROSS MULTIPLE STORAGE DEVICES

BACKGROUND OF THE INVENTION

1. Technical Field

This application relates to the field of computer storage devices, and more particularly to the field of coordinating replicating data on a plurality of storage devices that are synchronized for consistent operation.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some instances, a single application or group of related applications may use more than one storage device simultaneously. However, in such a case, it may be necessary to ensure that write operations by the application or group of applications are performed in a particular order. For example, an application that handles fault-tolerant bank transactions may only work properly if it is possible to ensure that write operations occur in a particular order. This is not difficult from within the application since the application may simply perform the first write operation, wait for an acknowledgment of that write operation, perform a second write operation, wait for acknowledgment, etc.

However, in instances where it is desirable to make a copy of the data of the plurality of storage devices, it is necessary to ensure that the duplicate storage devices do not contain the result of write operations that depend on previous write operations unless the result of the previous write operations are also duplicated. For example, if an application writes A and then writes B only after the write for A is acknowledged, it may be important that the duplicate storage devices do not end up containing B but not A. One way to address this is to suspend write operations for the application (by, for example, not acknowledging write operations to a host device running the application), perform the copying operation, and then enabling write operations for the application. The resulting duplicate storage devices will contain neither A nor B, just A, or both A and B, but will not contain just B. However, the amount of time that write operations are suspended while the data copying is occurring may be unacceptable.

The time that writes are suspended may be reduced. Mirror storage devices may be provided to maintain shadow copies of primary storage devices. At a point in time when a replica of the data is desired, the mirror storage devices are split from the primary storage devices to cause shadow copying to cease. Of course, if the primary storage devices contain data for a single application or group of applications, it is still necessary to disable write operations for the primary storage devices just prior to the split. Write operations are enabled again after the split operation is complete. If there are relatively few storage devices, the relatively small amount of time that write operations are suspended may be acceptable. However, in instances where there are a significant number of storage devices involved, the delay associated with splitting mirror devices may be unacceptable.

Accordingly, it is desirable to provide a mechanism for replicating a relatively large group of storage devices at the same time without there being a relatively long amount of time during which write operations to the storage devices are suspended.

SUMMARY OF THE INVENTION

According to the present invention, concurrently replicating a plurality of storage devices includes disabling writes to all of the storage devices, setting a pending state change indicator for all of the storage devices after disabling writes without altering a replication state of any of the storage devices, and enabling writes to the storage devices after setting the pending state change indicator. An I/O operation to a particular one of the storage devices having a set pending state change indicator may cause the replication state of the particular one of the storage devices to change to provide for replication. Concurrently replicating a plurality of storage devices may include, following changing the replication state of the particular one of the storage devices, clearing the pending state change indicator. Concurrently replicating a plurality of storage devices may include initiating a background process to resolve the pending state change indicator for each of the storage devices. The background process may alter the replication state of each of the storage devices having a set pending state change indicator and then may clear the pending state change indicator. The background process may disable write operations to each of the storage devices prior to altering the replication state thereof and then may enable write operations after clearing the pending state change indicator. The pending state change indicator may be a bit in a buffer that is examined in connection with I/O operations for the storage devices.

According further to the present invention, computer software, in a computer readable storage medium, concurrently replicates a plurality of storage devices. The computer software includes executable code that disables writes to all of the storage devices, executable code that, after disabling writes, sets a pending state change indicator for all of the storage devices without altering a replication state of any of the storage devices, and executable code that enables writes to the storage devices after setting the pending state change indicator. An I/O operation to a particular one of the storage devices having a set pending state change indicator may cause the replication state of the particular one of the storage devices to change to provide for replication. The computer software may also include executable code that clears the pending state change indicator following changing the replication state of the particular one of the storage devices. The computer software may also include executable code that initiates a background process to resolve the pending state change indicator for each of the storage devices. The background process may alter the replication state of each of the storage devices having a set pending state change indicator and then may clear the pending state change indicator. The background process may disable write operations to each of the storage devices prior to altering the replication state thereof and then may enable write operations after clearing the pending state change indicator. The pending state change indicator may be a bit in a buffer that is examined in connection with I/O operations for the storage devices.

According further to the present invention, concurrently replicating a plurality of storage devices includes setting a first indicator to be inactive where the first indicator causes writes to be disabled to the storage devices when the first indicator is set to active, setting a second indicator to inactive where the second indicator causes a replication state change for the plurality of storage devices when the second indicator is set to active, setting a third indicator to inactive where the third indicator causes writes to be enabled to the storage devices when the third indicator is set to active, following setting the first, second, and third indicators to inactive, setting the first indicator to active, following setting the first indicator to active, setting the second and third indicators to active and following setting the second and third indicators to active, setting the first indicator to inactive. Concurrently replicating a plurality of storage devices may also include initiating a background process that examines the indicators and initiates a replication state change in response to the second indicator being set for a device. Each of the indicators may include a bit map where the state of each bit indicates whether the indicator is active or inactive for the corresponding device.

According further to the present invention, a computer readable medium has computer executable instructions for performing any of the steps described herein.

According further to the present invention, a system has at least one processor that performs any of the steps described herein.

DETAILED DESCRIPTION OF VARIOUS EMBODIMENTS

Figure 1:
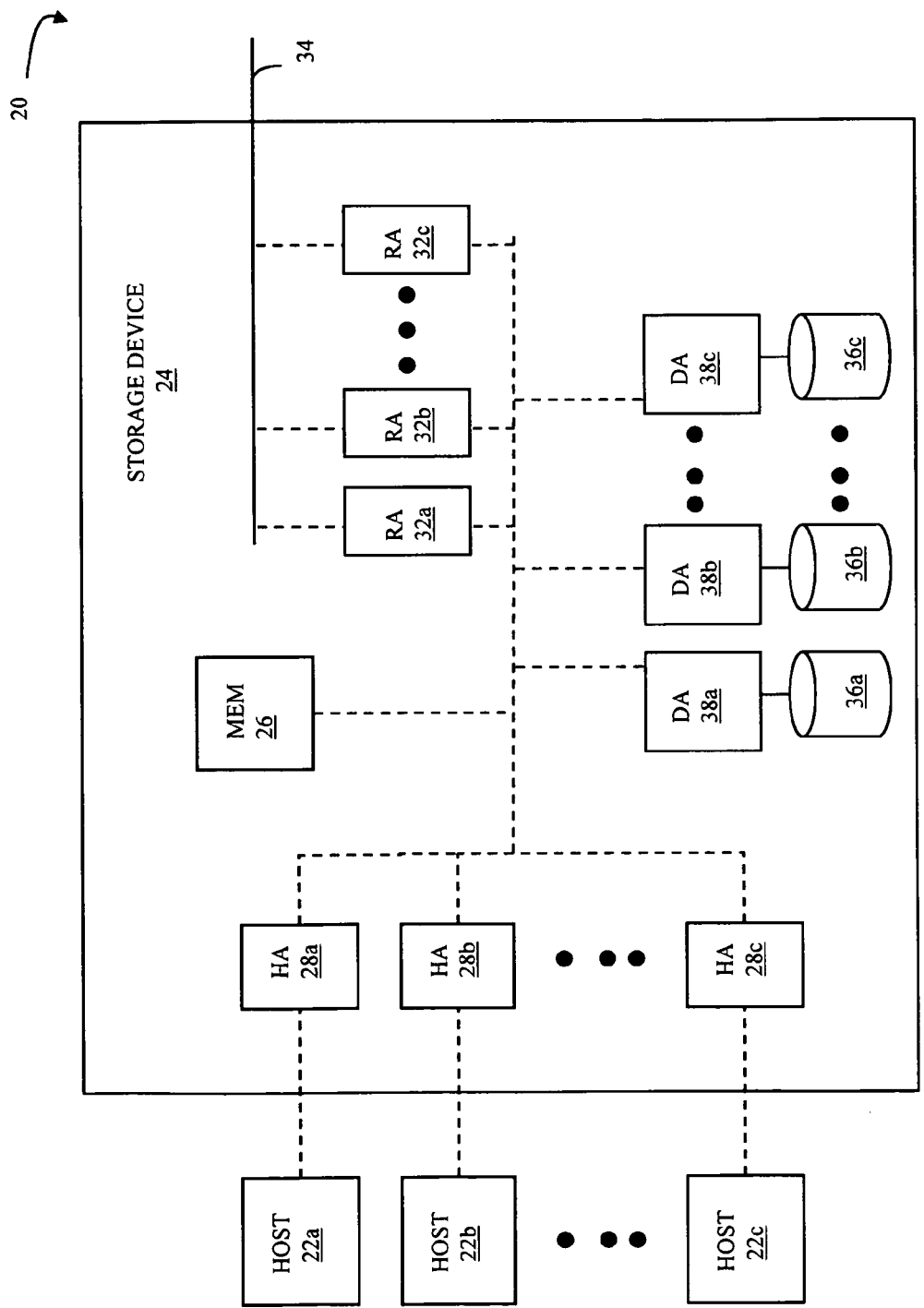
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
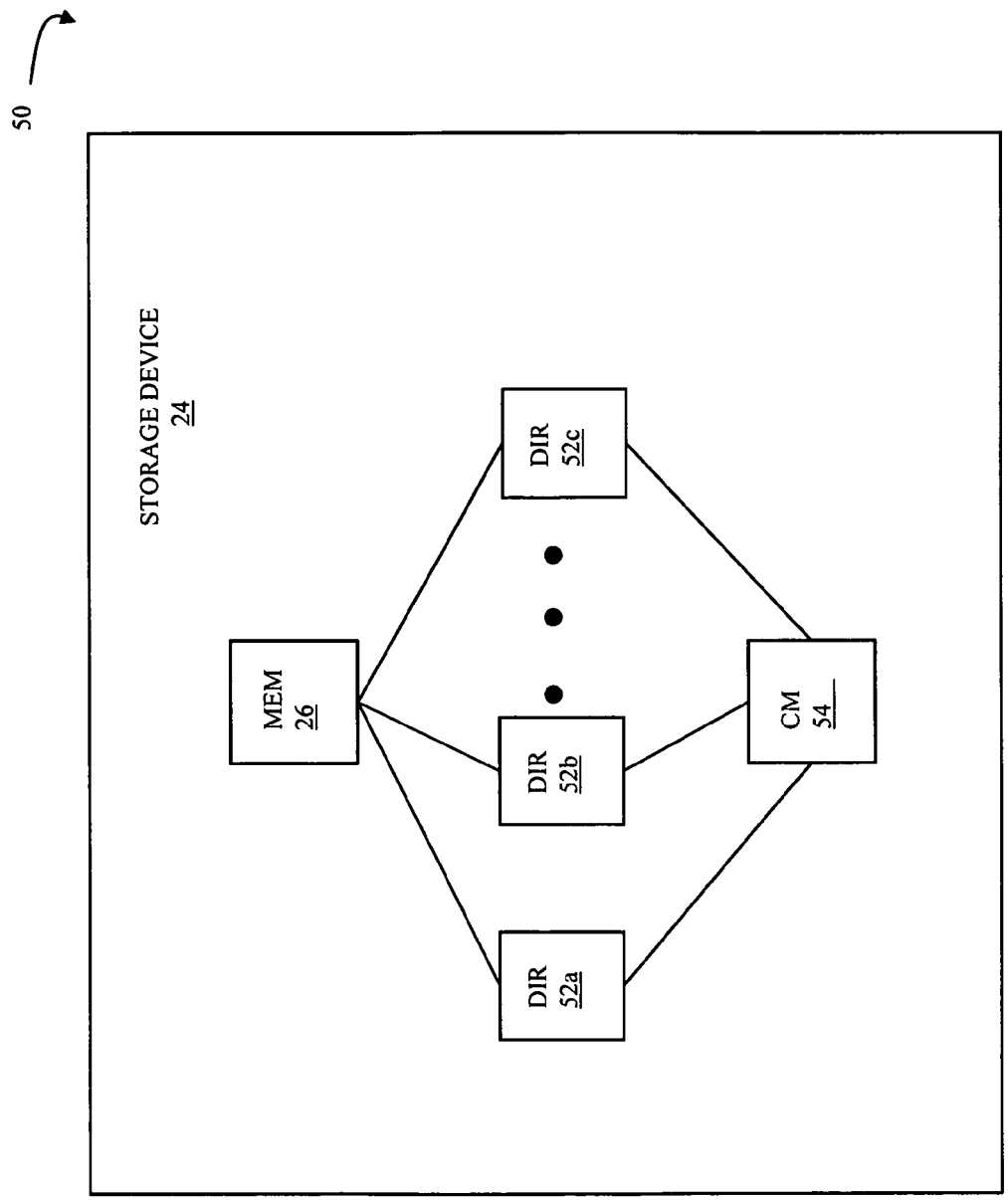
FIG. 2 is a schematic diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixty-four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

Figure 3:
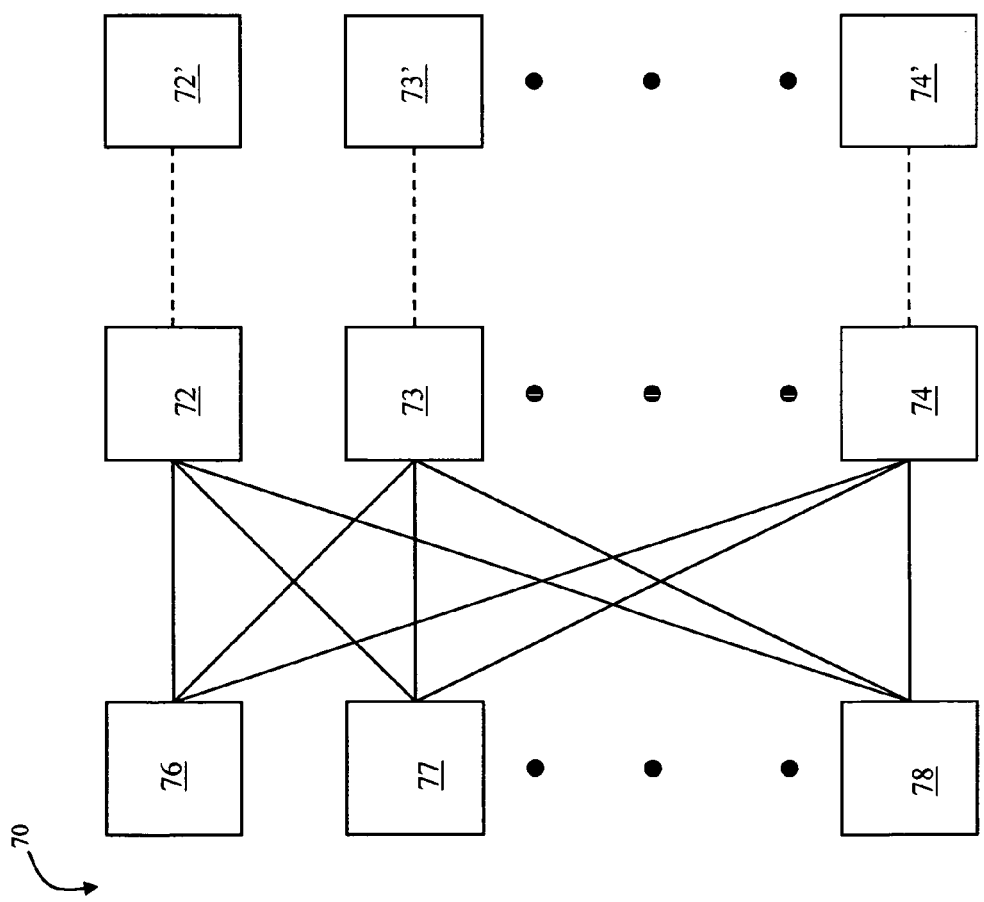
FIG. 3 is a diagram illustrating a plurality of storage devices and a plurality of hosts that may perform replicating operations according to the system described herein.

Referring to FIG. 3, a diagram 70 illustrates a plurality of storage devices 72-74 coupled to a plurality of hosts 76-78. The storage devices 72-74 may be synchronized for consistent operation so that dependent data write operations are provided even in cases where the data write operations span multiple storage devices 72-74. For example, a single application may write data to a plurality of the storage devices 72-74 by first writing A to one of the storage devices 72-74, and then, after receiving an acknowledgement that A was successfully written, then writing B to another one of the storage devices 72-74. The storage devices 72-74 represent two or more storage devices. The storage devices 72-74 may be coupled to any number of hosts. In some cases there may be a single host while in others there may be a plurality of hosts such as the plurality of hosts 76-78 illustrated in the diagram 70 of FIG. 3.

It is desirable to replicate the data on the storage devices 72-74. Replication may be performed by any means including copying data, a mirror split, a clone, a pointer-based snapshot, a remote synchronous or asynchronous replica, etc. The system described herein does not depend upon any particular replication technique being used and may be adapted to any replication technique used across multiple storage devices.

In instances where data on the storage devices 72-74 is to be replicated, the dependency of data write operations to the storage devices 72-74 needs to be taken into account. Conceptually, all data write operations from the hosts 76-78 to the storage devices 72-74 may be halted, the replication operation may be performed to replicate the data to a plurality of corresponding new storage devices 72'-74', and then data write operations may be resumed from the hosts 76-78 to the storage devices 72-74. However, it may be impractical or undesirable to halt all data write operations from the hosts 76-78 to the storage devices 72-74 while replication occurs.

Figure 4:
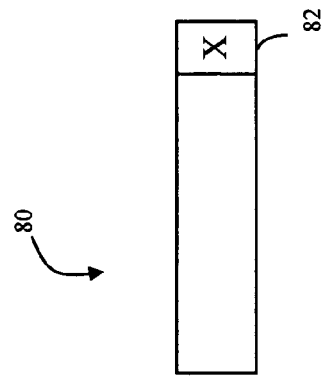
FIG. 4 is a diagram illustrating a ready buffer and a state change pending bit according to the system described herein.

Referring to FIG. 4, a ready buffer 80 is shown as including a state change pending bit 82 for indicating that a state change in connection with replication is pending for one of the storage devices 72-74. Use of the state change pending bit 82 is discussed in more detail elsewhere herein. In an embodiment herein, the ready buffer 80 is provided in the memory 26 or in some other location that is accessible to the directors 52a-52c where each of the storage devices 72-74 has a corresponding ready buffer 80. For each I/O operation (read/write/query) for each of the storage devices 72-74, the corresponding ready buffer 80 is examined prior to performing the operation.

In an embodiment herein, the ready buffer 80 is a pre-existing mechanism that is already part of the I/O system and the state change pending bit 82 is used in connection with the pre-existing mechanism. Of course, in other systems there may be other mechanisms where a data structure, register, etc. is examined in connection with I/O operations for each storage device. In those systems, an appropriate mechanism like the state change pending bit 82 may be used. Thus, for the discussion herein, it may be understood that reference to the state change pending bit 82 being set or not set includes any mechanism that may be used to indicate that a state change in connection with a replication operation is pending for a storage device. Note that it is also possible to have a system where the ready buffer 80 or some other appropriate mechanism is examined in connection with each I/O operation only when a replication operation for at least one of the storage devices 72-74 is desired and otherwise is not examined.

Figure 5:
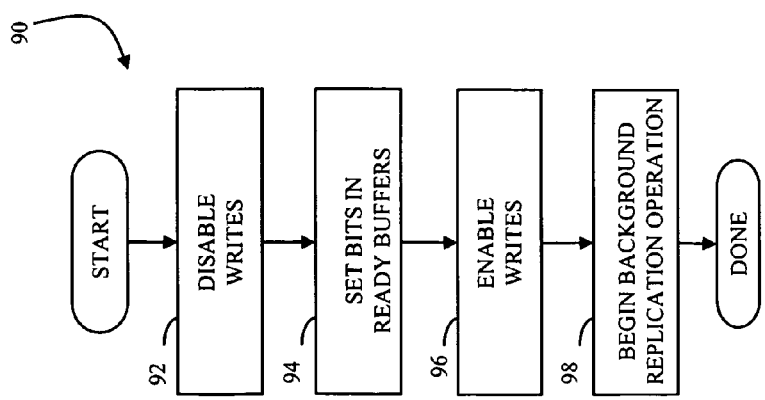
FIG. 5 is a flow chart illustrating initiating replication operations according to the system described herein.

Referring to FIG. 5, a flowchart 90 illustrates steps performed in connection with setting up a replication operation to replicate data on the storage devices 72-74 to the storage devices 72'-74'. The steps of the flowchart 90 may be performed by one or more of the storage devices 72-74, one or more of the hosts 76-78, and/or any other entity or combination of entities capable of providing the functionality described herein.

Processing begins at a first step 92 where write operations to the storage devices 72-74 are disabled. In an embodiment herein, write operations may be disabled/enabled by setting/clearing a bit in the ready buffer 80 that is different from the state change pending bit 82. However, for other systems, there may be other mechanisms for disabling/enabling write operations to the storage devices 72-74.

Following the step 92 is a step 94 where the state change pending bit 82 in the ready buffer 80 is set for all of the storage devices 72-74. Following the step 94 is a step 96 where write operations to the storage devices 72-74 are enabled. Note that once write operations to the storage devices 72-74 have been enabled, the system may operate normally even though, as discussed in more detail elsewhere herein, the replication operation may not necessarily have completed (or even started) for all of the storage devices 72-74. Following the step 96 is a step 98 where a background replication operation is initiated. The background replication operation is discussed in more detail elsewhere herein. Following the step 98, processing is complete.

Figure 6:
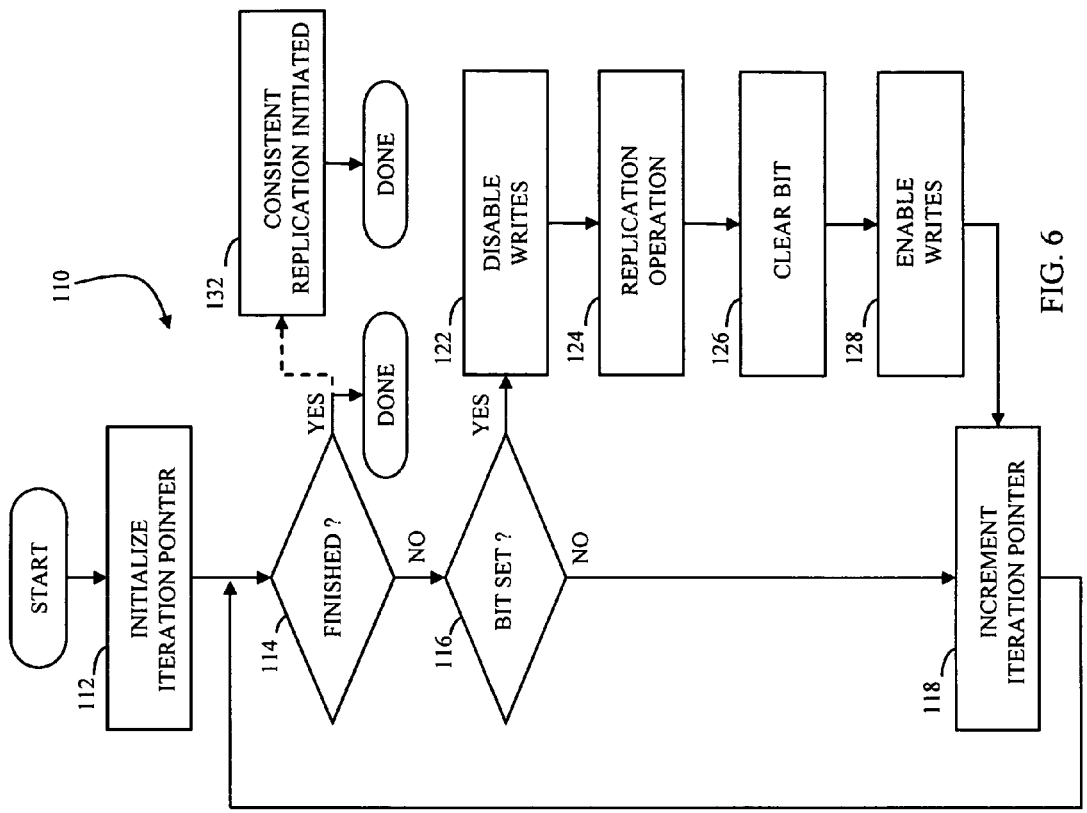
FIG. 6 is a flow chart illustrating performing a background process that resolves pending state change operations according to the system described herein.

Referring to FIG. 6, a flowchart 110 illustrates steps performed for the background replication operation discussed above in connection with the step 98 of the flowchart 90 a FIG. 5. The steps of the flowchart 110, as with any of the other software described herein, may be performed by one or more of the storage devices 72-74, one or more of the hosts 76-78, and/or any other entity or combination of entities capable of providing the functionality described herein.

Processing begins at a first step 112 where an iteration pointer, used to iterate through all of the storage devices 72-74, is set to point to the first one of the storage devices 72-74. Following the step 112 is a step 114 where it is determined if the iteration pointer indicates that processing of all the storage devices 72-74 is finished (i.e., all of the storage devices 72-74 have been processed). Of course, on a first iteration, the result of the test at the step 114 will be that processing is not finished.

If it is determined at the test step 114 that processing is not finished, then control transfers from the test step 114 to a test step 116 where it is determined if the state change pending bit 82 in the ready buffer 80 is set for the storage device indicated by the iteration pointer. Of course, the test at the step 116 may be different if a different mechanism is used to indicate a pending state change for a storage device. If it is determined at the test step 116 that the state change pending bit 82 is not set, then control transfers from the test step 116 to a step 118 were the iteration pointer is set to point to the next one of the storage devices 72-74. Following step 118, control transfers back to the test step 114 for a next iteration.

If it is determined at the test step 116 that the state change pending bit 82 is set, then control transfers from the test step 116 to a step 122 to disable write operations to the particular one of the storage devices 72-74 being pointed to by the iteration pointer. Following the step 122 is a step 124 where the replication state of the storage device is altered. Note that the actual replication may not be performed at the step 124 but, instead, the processing necessary to alter the replication state is performed. For example, if the replication operation involves performing a split of a mirror, then the processing performed at the step 124 may include setting appropriate parameters for performing the split operation (e.g., causing the mirror device to no longer receive writes made to the primary device). As another example, if the replication involves an actual copy of data from one of the storage devices 72-74 to a corresponding one of the storage devices 72'-74', then the processing performed at the step 124 may include performing the copy operation or may involve setting appropriate parameters and allowing other processes (e.g., a background copy process) to perform the actual copy.

Any other possible replication operations/replication state change operations may be performed at the step 124 that is consistent with the particular mechanism being used for replication. The system described herein does not depend upon any particular replication mechanism being used. For the discussion herein, the operations performed at the step 124 (and similar steps) may be referred to as replication operations and be understood to include any replication operations, replication state change operations, etc.

Following the step 124 is a step 126 where the state change pending bit 82 is cleared indicating that the processing for the replication operation has been performed. Following the step 126 is a step 128 where write operations are enabled to the particular one of the storage devices 71-74 indicated by the iteration pointer. Following the step 128 is the step 118, discussed above, where the iteration pointer is incremented.

In some embodiments, it may be the case that the ready buffer 80 (or the equivalent) is used only when there are unresolved replication related state change operations for one of the storage devices 72-74. In such embodiments, it may be useful to perform additional processing to inhibit examination of the ready buffer 80 after all of the state change pending bits have been resolved. This is indicated by an alternative path from the test step 114 to a step 132 where appropriate processing is performed to inhibit further examination of the ready buffer 80 (e.g., appropriate message to the directors 52a-52c) by signaling that that consistent replication has been initiated. Following the step 132, processing is complete. Examination of the ready buffer 80 and the state change pending bit 82 in connection with I/O operations is discussed in more detail elsewhere herein.

Note also that, in some embodiments, it may not be necessary to disable writes to the storage device at the step 122, in which case of course it is not necessary to reenable writes at the step 128. For example, if every I/O operation to the storage device is intercepted because the state change pending bit is set (discussed in more detail elsewhere herein) then it may not be necessary to enable/disable writes. Of course, there may be circumstances where, depending upon the specific replication operation being performed, it may be useful to enable/disable writes to avoid data inconsistencies. Accordingly, the disable writes step 122 and the corresponding enable writes step 128 may be considered optional and the inclusion of the disable/enable steps 122, 128 may simply depend upon the types of operations being performed.

Figures 7, 8:
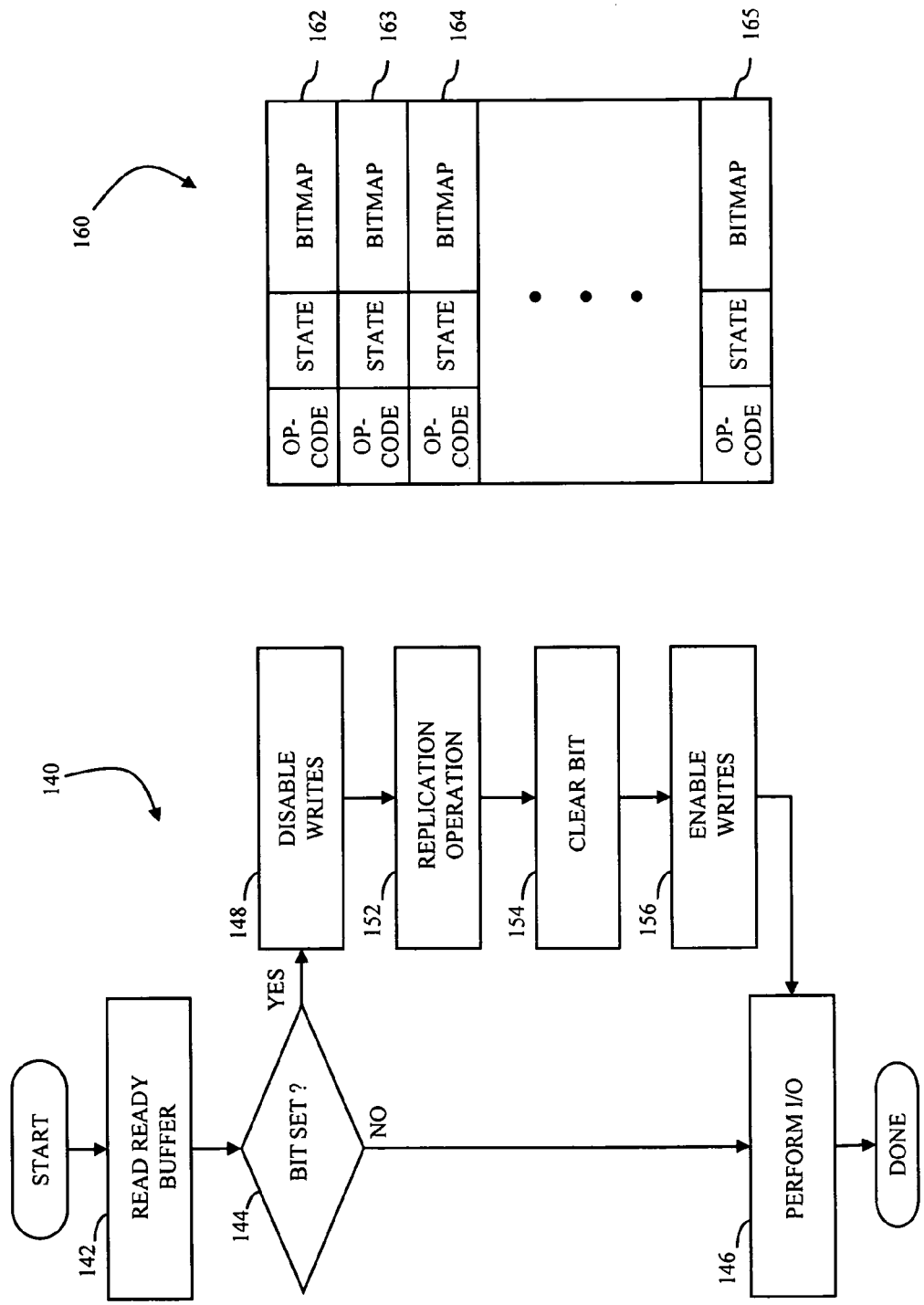
FIG. 7 is a flow chart illustrating I/O operations for a storage device when the state change operations are pending according to the system described herein.
FIG. 8 is a diagram illustrating a table that may be used for resolving pending state change operations in another embodiment of the system described herein.

Referring to FIG. 7, a flowchart 140 illustrates processing performed in connection with an I/O operation for one of the storage devices 72-74 when there is a possibility of a state change pending bit still being set for at least one of the storage devices 72-74. Note that if the state change pending bit 82 is set, then the result of any I/O operation, including a query, could be affected by not having yet processed the state change. Thus, for the system described herein, I/O operations include read operations, write operations, status check operations, and any other possible I/O operation for which the state change should be resolved prior to performing the operation.

In some embodiments, the processing illustrated by the flowchart 140 is performed for all I/O operations while, in other embodiments, the processing illustrated by the flowchart 140 is only performed for I/O operations when there is a state change pending bit that is set for at least one of the storage devices 72-74. In those embodiments, a mechanism is used to cause different I/O processing to be performed that does not check the ready buffer 80 once it is determined that all state change pending bits for all of the storage devices 72-74 are cleared. The special processing may include, for example, the step 132 discussed above in connection with the flowchart 110 of FIG. 6.

Processing begins at a first step 142 where the ready buffer 80 for the storage device is read. Following the step 142 is a test step 144 which determines if the state change pending bit 82 is set. If not, then control transfers from the test step 144 to a step 146 where the I/O operation is performed. Following step 146, processing is complete.

If it is determined at the test step 144 that the state change pending bit 82 is set, then control transfers from the test step 144 to a step 148 where write operations to the storage device are disabled. Of course, in systems where only one I/O operation at a time is allowed, it may not be necessary to disable write operations at the step 148 since, by definition, there can be no other write operation besides the current write operation. However, in other systems where it is possible to have multiple simultaneous write operations, it may be useful to disable any other possible write operations at the step 148. Of course, just as with the steps 122, 128, discussed above, in some instances it may be useful to disable/enable write operations while in other instances it may not be necessary.

Following the step 148 is a step 152 where the replication operation is performed. The processing provided at the step 152 is like the processing provided at the step 124 of the flowchart 110 of FIG. 6, discussed above. The specific processing performed at the step 152 depends upon the particular mechanism used for replication. As with the step 124, the system described herein does not depend upon any particular mechanism used for replication. Following step 152 is a step 154 where the state change pending bit 82 for the storage device is cleared. Following the step 154 is a step 156 where write operations to the storage device are enabled. Of course, in instances when it is not necessary to disable write operations at the step 148, it is also not necessary to enable write operations at the step 156. Following the step 156 is the step 146, discussed above, where the I/O operation to the storage device is performed.

The system described above provides an efficient mechanism for simultaneously replicating a plurality of storage devices that are synchronized for consistent operation. For the system described above, write operations to the storage devices 72-74 may be disabled for as long as it takes to set the state change pending bit 82 in the ready buffer 80 for all of the storage devices 72-74. However, as described in more detail below, it may be possible to gain even further efficiencies and reduce the amount of time that write operations to the storage devices 72-74 are disabled.

Referring to FIG. 8, a table 160 has a plurality of entries 162-165 that are used for simultaneously replicating the storage devices 72-74. Each of the entries 162-165 includes an opcode field, a state field indicating whether the entry is active or inactive, and a bitmap field having a bit corresponding to each one of these storage devices 72-74 that are being replicated. The opcode field indicates one of: disable write operation, run replication operation, or enable write operation. Use of the opcode field, the state field, and the bitmap field are described in more detail elsewhere herein. The table 160 may be provided in the memory 26 or at any other location that it is consistent with the processing described herein.

Figures 9, 10:
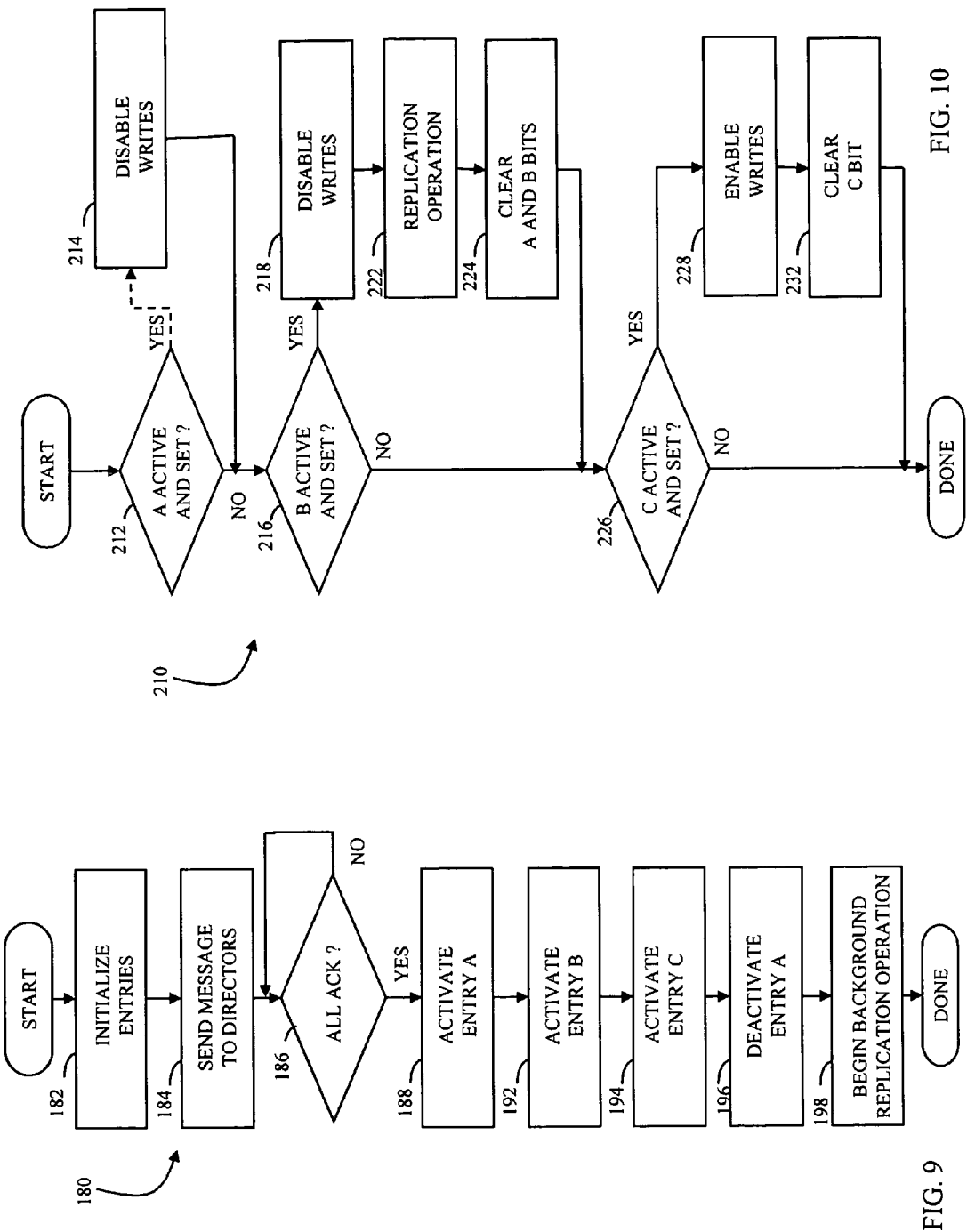
FIG. 9 is a flow chart illustrating initiating replication operations in another embodiment of the system described herein.
FIG. 10 is a flow chart illustrating I/O operations for a storage device when the state change operations are pending in another embodiment of the system described herein.

Referring to FIG. 9, a flowchart 180 illustrates steps performed in connection with initiating a replication operation for the storage devices 72-74. The steps of the flowchart 180 may be performed by one or more of the storage devices 72-74, one or more of the hosts 76-78, and/or any other entity or combination of entities capable of providing the functionality described herein.

Processing begins at a first step 182 where three unused ones of entries 162-165 in the table 160 are initialized. One of the entries, called "entry A" for purposes of the discussion herein, is initialized with an opcode field indicating a disable writes operation, a state field of inactive, and all of the bits of the bitmap set to one. The second entry, called "entry B" for purposes of the discussion herein, is initialized with an opcode field indicating a run replication operation, a state field of inactive, and all of the bits of the bitmap set to one. The third entry, called "entry C" for purposes of the discussion herein, is initialized with an opcode field indicating an enable writes operation, a state field of inactive, and all of the bits of the bitmap set to one. Use and modification of the entries is discussed in more detail elsewhere herein.

Note that the bits of the bitmap field indicate which devices will be replicated. As the pending replication state of each device is resolved, the corresponding bit is changed from one to zero. In instances where it is not desirable to replicate all of the devices, the bits corresponding to those devices that are not to be replicated are initialized to zero to prevent the replication state change operations from occurring.

Following the step 182 is a step 184 where a message is sent to all of the directors 52a-52c informing the directors 52a-52c to check entry A, entry B, and entry C of the table 160 in connection with performing I/O operations. Following the step 184 is this test step 186 where it is determined if all of the directors 52a-52c have acknowledged receipt of the message sent at the step 184. The test step 186 represents waiting for acknowledgment from all of the directors 52a-52c before proceeding.

Following the step 186 is a step 188 where the state field of entry A is changed from inactive to active. Following the step 188 is a step 192 were the state field of entry B is changed from inactive to active. Following the step 192 is a step 194 were the state field of entry C is changed from inactive to active. Following the step 194 is a step 196 where the state field of entry A is changed from active to inactive. Following the step 196 is a step 198 where a background replication operation is initiated. The background replication operation initiated at the step 198 is discussed in more detail elsewhere herein. Following the step 198, processing is complete.

Referring to FIG. 10, a flowchart 210 illustrates steps performed in connection with an I/O operation performed to one of the storage devices 72-74 while the state field of at least one of the entries 162-165 may be active. The processing illustrated by the flowchart 210 may be performed by the directors 52a-52c in connection with an I/O operation after the directors 52a-52c have received the message sent at the step 184 of the flowchart 180 a FIG. 9.

Processing begins at a first test step 212 where it is determined if entry A is in an active state and if the bit corresponding to the storage device performing the I/O operation is set. If so, then control transfers from the test step 212 to a step 214 where write operations to the storage device are disabled. Disabling writes to the storage device may be provided by any appropriate mechanism including, for example, setting a bit other than the state change pending bit 82 in the ready buffer 80. As discussed above, in instances such as where simultaneous I/O operations are not possible, or in other instances, the processing performed at the step 214 may not be necessary or desirable.

Following the step 214 is a test step 216. Note that the test step 216 also follows the step 212 if entry A is not active and/or if the bit corresponding to the particular storage device reforming the I/O operation is not set in entry A. At the test step 216 it is determined if entry B is active and if the entry B bit corresponding to the storage device performing the I/O operation set. If so, then control transfers from the test step 216 to a step 218 where write operations to the storage device performing the I/O operation are disabled. Note that, as discussed elsewhere herein, it may not be necessary to disable writes at the step 218. Following the step 218 is a step 222 where the replication operation is performed. Just as with the steps 124, 152, discussed above, the system described herein does not depend on any particular type of replication operation and thus, the replication operation performed at the step 222 varies according to the type of replication that is used.

Following the step 222 is a step 224 where the bits corresponding to the storage device performing the I/O operation are cleared in the bit field of both entry A and entry B. Accordingly, when another I/O operation is performed on the same storage device, the steps 214, 218, 222, 224 will not be performed again. Similarly, the background replication operation will not need to perform similar processing for the storage device a second time since the bits for entry A and entry B have been cleared at the step 224.

Following the step 224 is a test step 226. Note that the test step 226 is also reached if it is determined at the test step 216 that entry B is not active and/or the bit in the bitmap field for entry B corresponding to the storage device performing the I/O operation is not set. At the test step 226 it is determined if entry C is active and if the bit in the bitmap field of entry C corresponding to the storage device performing the I/O operation is set. If so, then control transfers from the test step 226 to a step 228 where write operations to the storage device are enabled. Following the step 228 is a step 232 where the bit corresponding to the storage device performing the I/O operation in the bitmap field of entry C is cleared. Following the step 232, processing is complete. Note also that processing is complete if it is determined at the test step 226 that entry C is not active and/or if the bit in the bitmap field of entry C corresponding to the storage device performing the I/O operation is not set.

Figure 11:
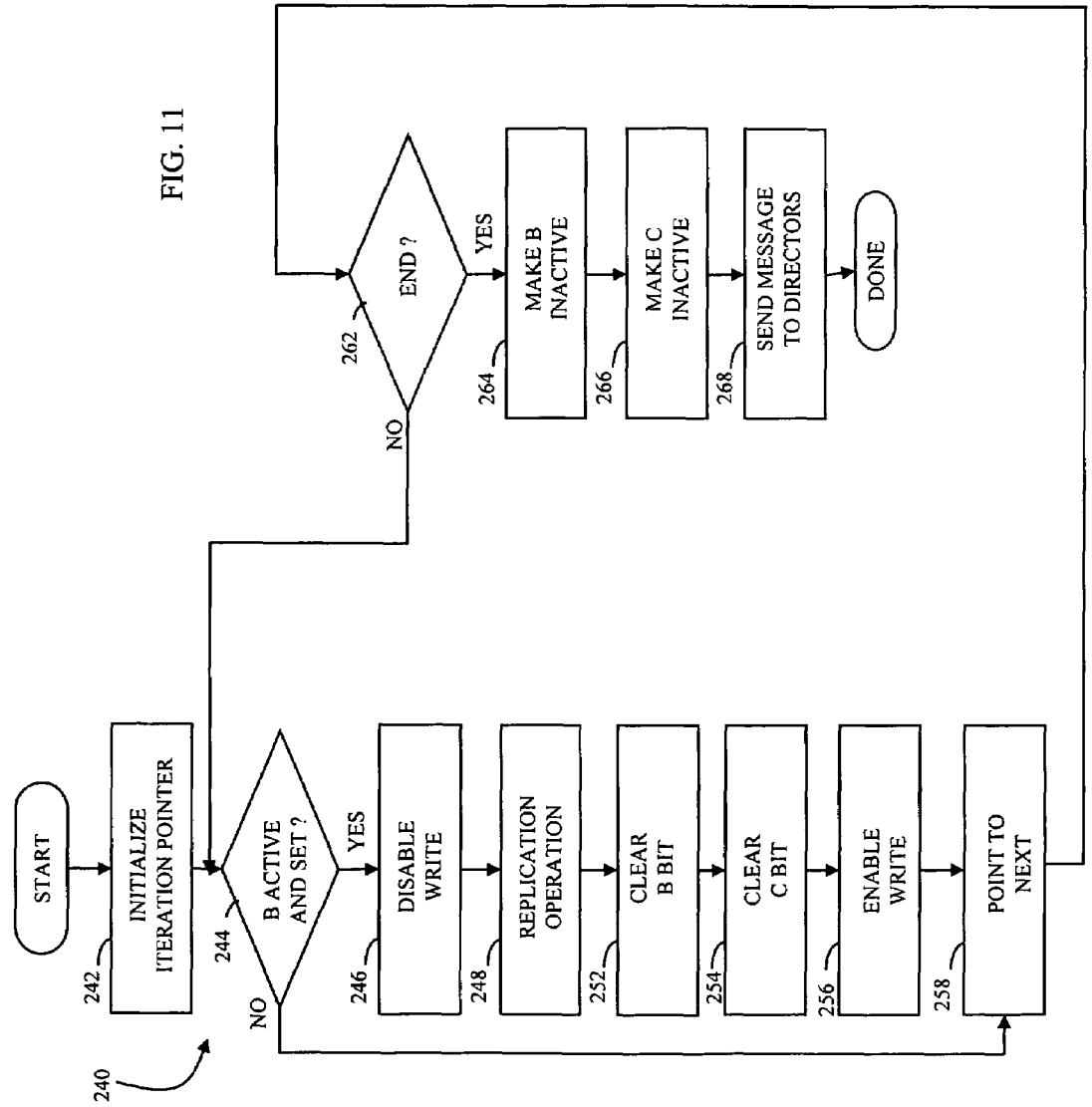
FIG. 11 is a flow chart illustrating performing a background process that resolves pending state change operations in another embodiment of the system described herein.

Referring to FIG. 11, a flowchart 240 illustrates steps performed by a background replication operation process that is initiated at the step 198 of the flowchart 180 of FIG. 9, discussed above. The replication operation process illustrated by the flowchart 240 completes the replication operation for the storage devices 72-74 as a background process. Just as with other portions of the software discussed herein, the processing illustrated by the flowchart 240 may be performed by one or more of the storage devices 72-74, one or more of the hosts 76-78, and/or one or more entities capable of providing the functionality described herein.

Processing begins at a first step 242 where an iteration pointer is set to point to the first one of the storage devices 72-74. The iteration pointer is used to iterate through whatever data structure is used to represent all of the storage devices 72-74 that are being simultaneously replicated. Following the step 242 is a test step 244 where it is determined if the bit corresponding to the storage device pointed to by the iteration pointer in the bitmap field of entry B is set. If so, then control transfers from the test step 244 to a step 246 where write operations to the storage device are disabled. Following the step 246 is a step 248 where the replication operation is performed consistent with the type of replication used, as discussed elsewhere herein. Following the step 248 is a step 252 where the bit tested at the step 244 (the bit in the B bitmap field for the storage device) is cleared. Following the step 252 is a step 254 where the bit corresponding to the storage device in the bitmap field of entry C is also cleared. Following the step 254 as a step 256 where writes to the storage device corresponding to the iteration pointer are enabled. Following the step 256 is a step 258 where the iteration pointer is made to point to the next storage device.

Note that the step 258 may be reached directly from the test step 244 if it is determined at the test step 244 that the bit corresponding to the storage device pointed to by the iteration pointer in the bitmap field of entry B is clear. Note also that, as discussed elsewhere herein, it may not be necessary to disable and enable writes to the storage device at the steps 246, 256.

Following the step 258 is a test step 262 where it is determined if the iteration pointer points past the end (i.e., all of the storage devices have been processed). If not, then control transfers from the test step 262 back to the step 244 for the next iteration. Otherwise, control transfers from the test step 262 to a step 264 where the state field of entry B is made inactive. Following the step 264 is a step 266 where the state field of entry C is made inactive. Following the step 266 is a step 268 where a message is sent to all of the directors 52a-52c to indicate that all pending replication operations have been resolved and thus, it is no longer necessary to perform the processing illustrated by the flowchart 210 of FIG. 10 in connection with each I/O operation (i.e, no longer necessary to check entry A, entry B, and entry C). Following the step 268, processing is complete.

While the invention has been disclosed in connection with various embodiments, modifications thereon will be readily apparent to those skilled in the art. Accordingly, the spirit and scope of the invention is set forth in the following claims.

What is claimed is:

1. A method of concurrently replicating a plurality of storage devices, comprising:
   disabling writes to all of the storage devices;
   setting a pending state change indicator for all of the storage devices after disabling writes without altering a replication state of any of the storage devices, the replication state of a particular storage device varying according to whether the particular storage device has been replicated by a replication operation; and
   enabling writes to the storage devices after setting the pending state change indicator.

2. A method, according to claim 1, wherein an I/O operation to a particular one of the storage devices having a set pending state change indicator causes the replication state of the particular one of the storage devices to change to provide for replication.

3. A method, according to claim 2, wherein, following changing the replication state of the particular one of the storage devices, clearing the pending state change indicator.

4. A method, according to claim 1, further comprising:
   initiating a background process to clear the pending state change indicator for each of the storage devices.

5. A method, according to claim 4, wherein the background process alters the replication state of each of the storage devices having a set pending state change indicator and then clears the pending state change indicator.

6. A method, according to claim 5, wherein the background process disables write operations to each of the storage devices prior to altering the replication state thereof and then enables write operations after clearing the pending state change indicator.

7. A method, according to claim 1, wherein the pending state change indicator is a bit in a buffer that is examined in connection with I/O operations for the storage devices.

8. A system having a computer readable storage medium and at least one processor that executes executable code stored on the computer readable storage medium that performs the steps recited in claim 1.

9. A computer readable storage medium that stores computer software that is executable by at least one processor and that concurrently replicates a plurality of storage devices, the computer software on the computer readable storage medium comprising:
   executable code that disables writes to all of the storage devices;
   executable code that, after disabling writes, sets a pending state change indicator for all of the storage devices without altering a replication state of any of the storage devices, the replication state of a particular storage device that varies according to whether the particular storage device has been replicated by a replication operation; and
   executable code that enables writes to the storage devices after setting the pending state change indicator.

10. The computer readable storage medium, according to claim 9, wherein an I/O operation to a particular one of the storage devices having a set pending state change indicator causes the replication state of the particular one of the storage devices to change to provide for replication.

11. The computer readable storage medium, according to claim 10, further comprising:
   executable code that clears the pending state change indicator following changing the replication state of the particular one of the storage devices.

12. The computer readable storage medium, according to claim 9, further comprising:
   executable code that initiates a background process to clear the pending state change indicator for each of the storage devices.

13. The computer readable storage medium, according to claim 12, wherein the background process alters the replication state of each of the storage devices having a set pending state change indicator and then clears the pending state change indicator.

14. The computer readable storage medium, according to claim 13, wherein the background process disables write operations to each of the storage devices prior to altering the replication state thereof and then enables write operations after clearing the pending state change indicator.

15. The computer readable storage medium, according to claim 9, wherein the pending state change indicator is a bit in a buffer that is examined in connection with I/O operations for the storage devices.

16. A method of concurrently replicating a plurality of storage devices, comprising:
- setting a first indicator to be inactive, wherein the first indicator causes writes to be disabled to the storage devices when the first indicator is set to active;
- setting a second indicator to inactive, wherein the second indicator causes a change in a replication state for the plurality of storage devices when the second indicator is set to active, the replication state of a particular storage device varying according to whether the particular storage device has been replicated by a replication operation;
- setting a third indicator to inactive, wherein the third indicator causes writes to be enabled to the storage devices when the third indicator is set to active;
- following setting the first, second, and third indicators to inactive, setting the first indicator to active;
- following setting the first indicator to active, setting the second and third indicators to active; and
- following setting the second and third indicators to active, setting the first indicator to inactive.

17. A method, according to claim 16, further comprising:
- initiating a background process that examines the indicators and initiates a replication state change in response to the second indicator being set for a device.

18. A method, according to claim 16, wherein each of the indicators includes a bit map and wherein the state of each bit indicates whether the indicator is active or inactive for the corresponding device.

19. A computer readable storage medium that stores computer executable instructions for performing the steps recited in claim 16.

20. A system having a computer-readable storage medium and at least one processor that executes executable code stored on the computer-readable storage medium that performs the steps recited in claim 16.

* * * * *

UNITED STATES PATENT AND TRADEMARK OFFICE
CERTIFICATE OF CORRECTION

PATENT NO. : 7,613,890 B1  Page 1 of 1
APPLICATION NO. : 11/395635
DATED : November 3, 2009
INVENTOR(S) : David Meiri It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this

Nineteenth Day of October, 2010

David J. Kappos
*Director of the United States Patent and Trademark Office*